Nov. 25, 1958  E. B. MASON  2,861,702
LUMBER STACKER
Filed Oct. 1, 1956  8 Sheets-Sheet 1

Fig.1

INVENTOR.
Edwin B. Mason
BY
ATTYS

Nov. 25, 1958  E. B. MASON  2,861,702
LUMBER STACKER

Filed Oct. 1, 1956  8 Sheets-Sheet 3

INVENTOR.
Edwin B. Mason
BY
ATTYS

Nov. 25, 1958 E. B. MASON 2,861,702
LUMBER STACKER
Filed Oct. 1, 1956 8 Sheets-Sheet 4

Fig. 4

INVENTOR.
Edwin B. Mason
BY
ATTYS

Nov. 25, 1958 E. B. MASON 2,861,702
LUMBER STACKER

Filed Oct. 1, 1956 8 Sheets-Sheet 8

INVENTOR.
Edwin B. Mason
BY
Webster & Webster
ATTYS

United States Patent Office 2,861,702
Patented Nov. 25, 1958

2,861,702
LUMBER STACKER
Edwin B. Mason, Stirling City, Calif.
Application October 1, 1956, Serial No. 613,188
4 Claims. (Cl. 214—6)

This invention relates to the lumber industry, and particularly to the stacking of lumber for drying after the same has been sawed into boards of a common length of the same thickness, but of possibly varying widths.

In making such stacks, it is desirable that each side edge of all the courses thereof shall lie in a common vertical plane.

With the mechanical stacking devices now in use, it is easy to attain this desired result if the width of the boards being stacked is constant. This however is frequently not the case. For instance, if a stack is to be 48 inches in over-all width and the four boards for each course of the stack as fed to the stacker should happen to be in two 12 inch widths and two 10 inch widths, there would be a space of four inches left at one side of the stack, if the boards are—as usual—in initially edge-to-edge contact. In the case of what is known as "shop lumber," which varies in width from 6 to 24 inches, a given number of pieces as fed onto the stack for each course may measure as much as 18 inches less than the selected total width of the stack being made.

The principal object of this invention is to provide a stacker mechanism, or stack loader, which will take the abutting pieces of course-forming lumber from the initial feed conveyor and place the lumber onto the stack in such a manner that irrespective of the actual combined width of such pieces, the side edges of such course will always be located in the same vertical planes as the side edges of the other courses. In this connection, it will of course be understood that the initial total width of the pieces which make up each course is never greater than that of the intended total width of the stack being made.

A further object of this invention is to provide a practical, reliable, and durable lumber stacker, and one which will be exceedingly effective for the purpose for which it is designed.

These objects are accomplished by means of such structure and relative arrangement of parts as will fully appear by a perusal of the following specification and claims.

Referring now more particularly to the drawings, and to the characters of reference marked thereon, the stacker comprises a frame structure, indicated generally at 1, which includes transversely spaced longitudinal beams 2, transverse longitudinally spaced beams 3 supported thereon, and uprights 4 supporting said beams 2 and 3.

Extending lengthwise of the frame structure are transversely spaced endless feed chains 5. The upper runs 6 of these chains are horizontal and are mounted on front and rear sprockets 7 and 8, respectively, disposed adjacent the ends of the frame structure some distance above the transverse beams 3.

Each chain, below said upper run, is engaged by a drive sprocket 9; all said sprockets being mounted on a common shaft 10 journaled on the frame structure and driven by an electric motor M. Longitudinal guide beam units 11 are mounted on transverse beams 3 between the various chain runs 7; each unit 11 slidably supporting and guiding a pair of racks 12 and 13 arranged in side-by-side relation with their rack teeth on the lower face.

Each rack 12 is engaged by a pinion 14; the pinions of all the racks 12 being mounted on a common shaft 15 journaled in bearings 16 supported from the under side of beam units 11, and driven from a reversible electric motor 17 by suitable chain and belt connections 18 therebetween.

Similarly, each rack 13 is engaged by a pinion 19; the pinions of all the racks 13 being spaced lengthwise of beam units 11 from pinions 14. Pinions 19 are mounted on a common shaft 20 journaled in bearings 21 supported from the under side of beam units 11, and driven from a reversible electric motor 22 by suitable chain and belt connections 23 therebetween. The circuits for the motors are separate from each other, so that said motors may be separately energized and controlled.

Pivoted at its rear end of each rack 12 intermediate the ends thereof, as at 24, is the long arm 25 of each loader arm unit L, which arm—when fully retracted—extends to the front end of the frame structure.

Similarly, pivoted at its rear end on each rack 13 intermediate the ends thereof, as at 26, is the short arm 27 of each loader arm unit L. Arm 27—when fully retracted—extends to a point short of the front end of arm 25 a distance approximately the same as—but in any case not less than—the width of each board B to be stacked.

Figure 4:
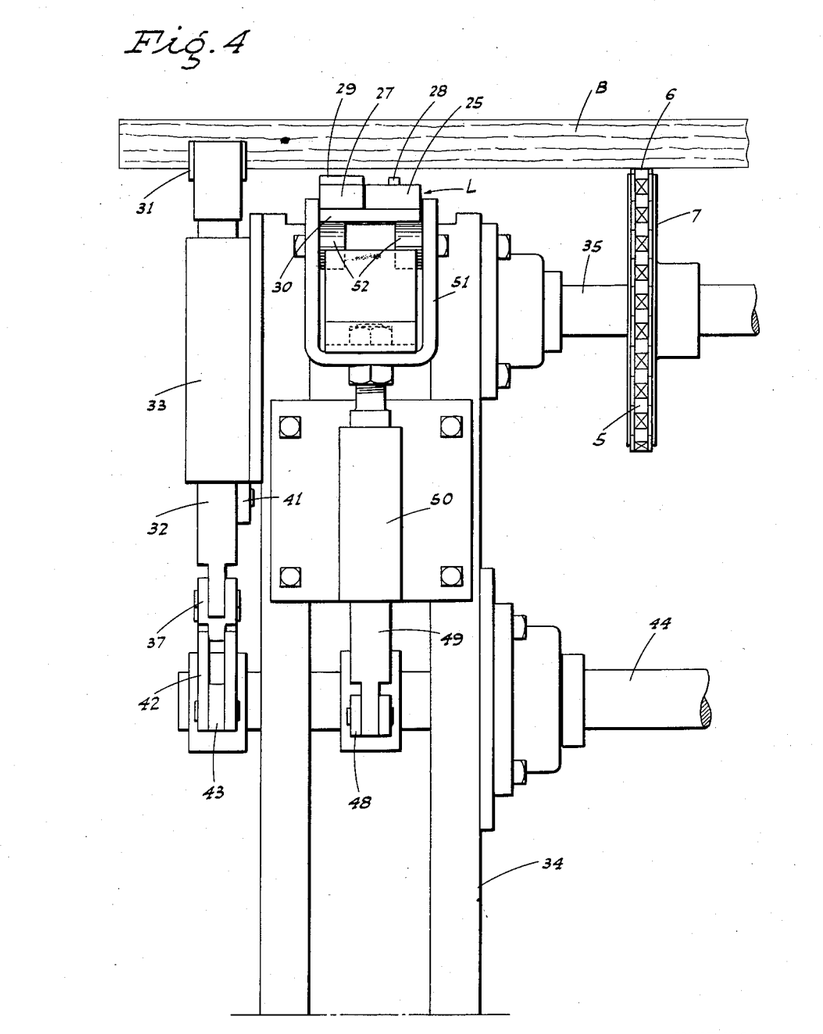
Fig. 4 is a forward end view of the same.
Figures 5, 6:
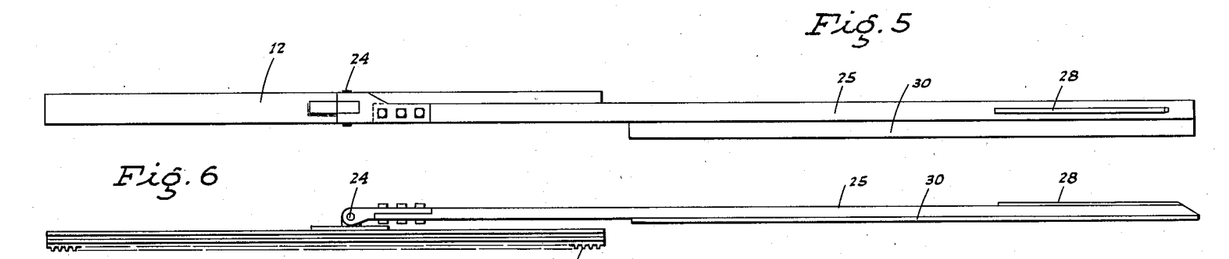
Fig. 5 is a top plan view of a long loader arm, detached.
Fig. 6 is a side view of the same.
Figure 7:
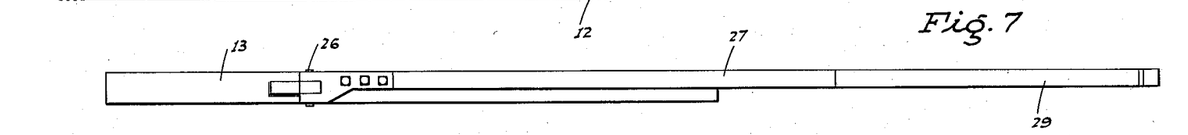
Fig. 7 is a top plan view of a short loader arm.
Figure 8:
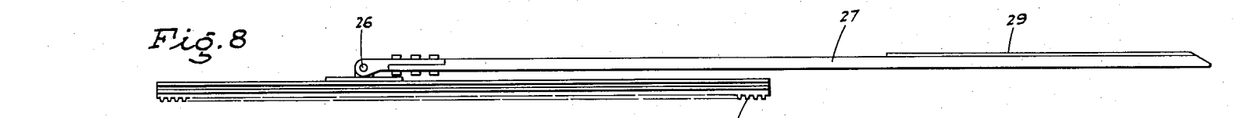
Fig. 8 is a side view of the same.
Figure 9:
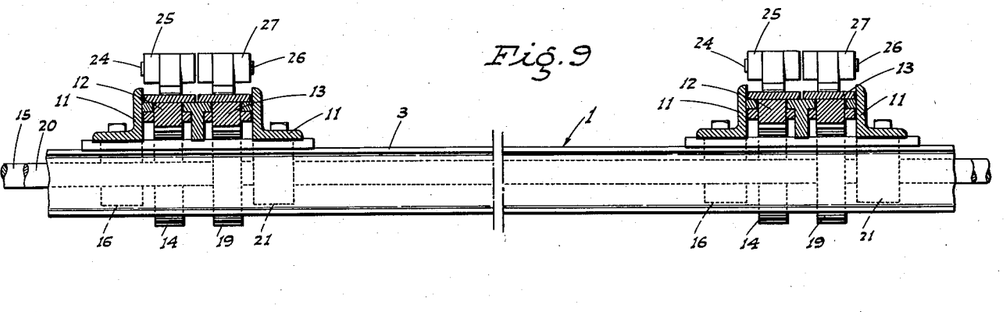
Fig. 9 is a fragmentary enlarged transverse section on line 9—9 of Fig. 2.

The arms 25 and 27 are on a common level, but arm 25 is provided at its forward end with a board-supporting rib 28, while arm 27 is provided along its forward portion with a board-supporting plate 29 of a length sufficient at least to engage two boards, and preferably slightly higher than the rib 28 (see Fig. 4). In any case, both the rib and plate are normally below the level of boards supported by the chain, as shown in said figure.

In order that both arms may be raised together from below when lifting pressure is applied to the long arm adjacent its forward end, a lip 30 projects under the arm 27 from the under side of arm 25, and engages said arm 27 in supporting but relatively slidable relation.

Figure 2:
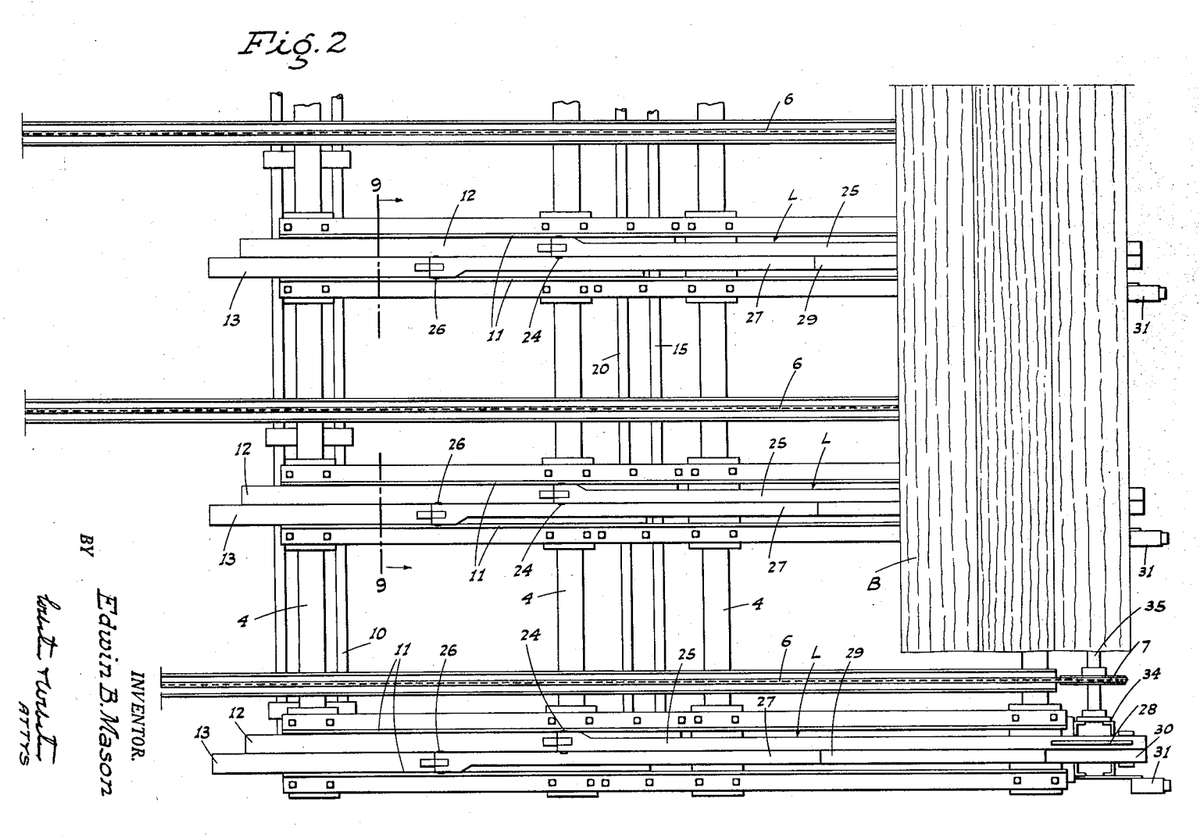
Fig. 2 is a fragmentary top plan view of the stacker, also somewhat diagrammatic.
Figure 3:
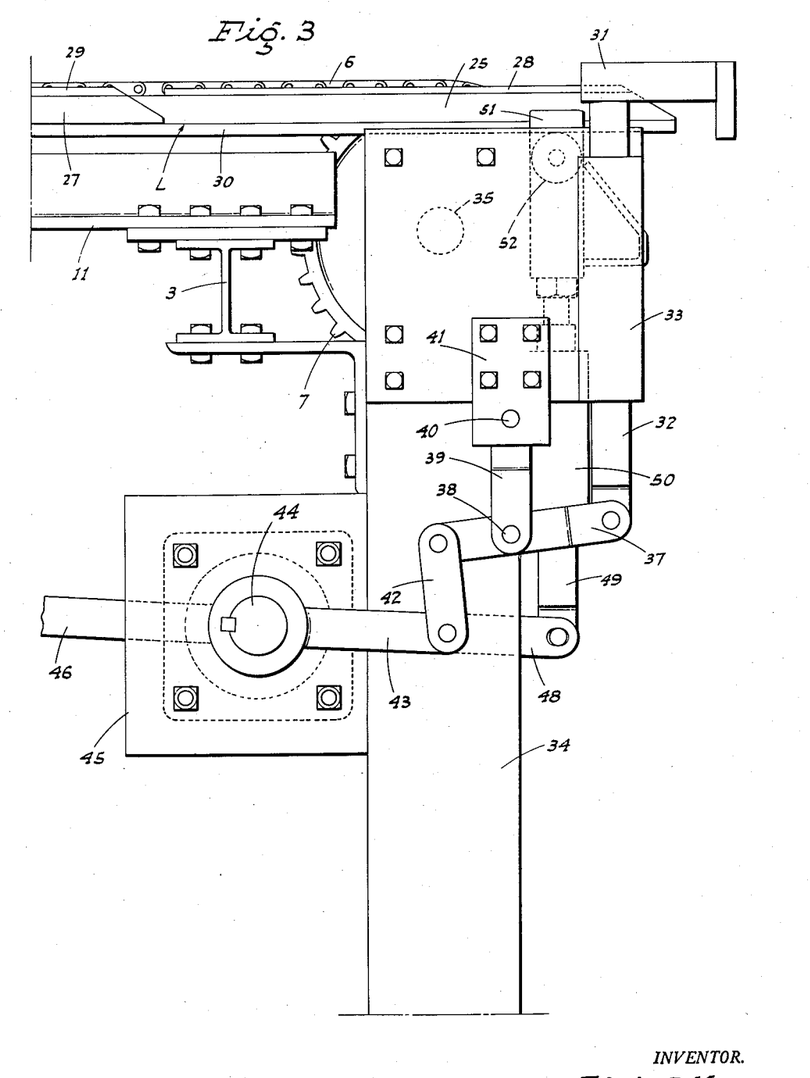
Fig. 3 is an enlarged fragmentary side elevation of the loader arm and lumber stop actuating mechanism.

To initially hold a predetermined number of boards B as fed by chains 5 in abutting relation at the forward end of the machine, and thus above the forward ends of the arm units L, stops 31 are positioned to engage the forward edge of the foremost board; these stops being preferably located adjacent and to one side of the arm units L, as shown in Fig. 2. Each stop is provided with a depending stem 32 slidable in a sleeve 33 secured in an upstanding post 34 which forms part of the frame structure 1. The common mounting shaft 35 of the forward sprockets 7 is also supported from said posts, as shown in Fig. 4.

The arm units L are for the purpose of advancing said plurality of boards from their stopped position onto the stickers S of a lumber stack being formed on a hydraulic or similar lift 36 positioned just beyond the forward end of the machine (see Figs. 10-15).

In order to so advance the boards, the stops must be lowered and the weight of the boards shifted from the chain runs 6 onto the arm units, so that the latter—when advanced—will position the boards over the stickers and lift. This is accomplished by the following mechanisms, which—in the main—are common to each stop and arm unit. A description of one such mechanism will therefore suffice for all.

Connected to each stem 32 at its lower end is a substantially horizontal lever 37 pivoted intermediate its ends, as at 38, on an upstanding supporting link 39. This link is pivoted at its upper end, as at 40, on a bracket 41 mounted on one side of the post 34. The lever 37 extends lengthwise of the machine and is connected at its rear end by a depending link 42 to the forward end of a radial arm 43. Arm 43 projects forwardly from—and is rigid with—a transverse shaft 44 extending across the machine behind the various posts 34, so that said shaft is common to the radial arms 43 of all the stop control mechanisms. The shaft 44 is journaled in connection with plates or brackets 45 rigid with—and projecting rearwardly from—the posts 34.

Figure 1:
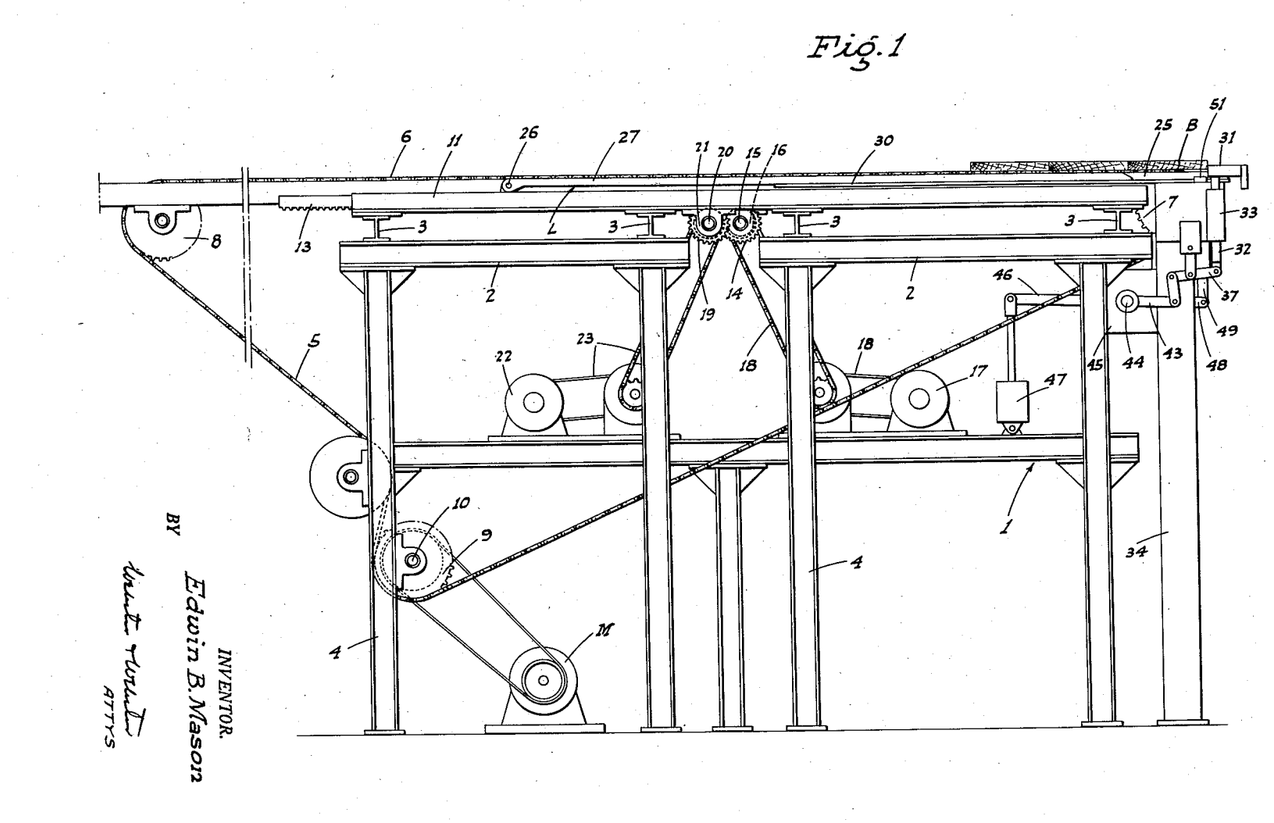
Fig. 1 is a fragmentary side elevation of the lumber stacker, in somewhat diagrammatic form.

The shaft 44 is rotated in a direction to raise arm 43, and thus cause the stop to be lowered, by means of a radial arm 46 rigid with—and projecting rearwardly from—said shaft, and connected at its rear end to a frame-supported power unit, such as an air cylinder 47 (see Fig. 1). Each mechanism also includes another forwardly projecting radial arm 48, rigid with shaft 44, and pivoted at its forward end on the lower end of a stem 49. This stem is slidably guided, intermediate its ends, in a sleeve 50 mounted on the forward side of post 34, and at its upper end carries an upstanding yoke 51 which straddles the arm unit L and the lip 20.

The bracket 45 carries a pair of rollers 52 engaging the under side of the lip and supporting the arm unit (see Fig. 4). Thus, at the same time the stop 31 is lowered, the arm unit L is raised; said unit swinging about pivots 24 and 26 as an axis. The raising of the arms 25 and 27 at their forward end, as effected by actuation of the cylinder 47, is sufficient to lift such portion of the arms above the adjacent portion of chain run 6, and at the same time the lowering of the stop is sufficient to clear the bottom face of the boards.

In operation, reference is particularly made to Figs. 10-15, which show the sequence of movement of the boards of a course from a chain-supported position to their final position on the stack.

Figures 10, 11:
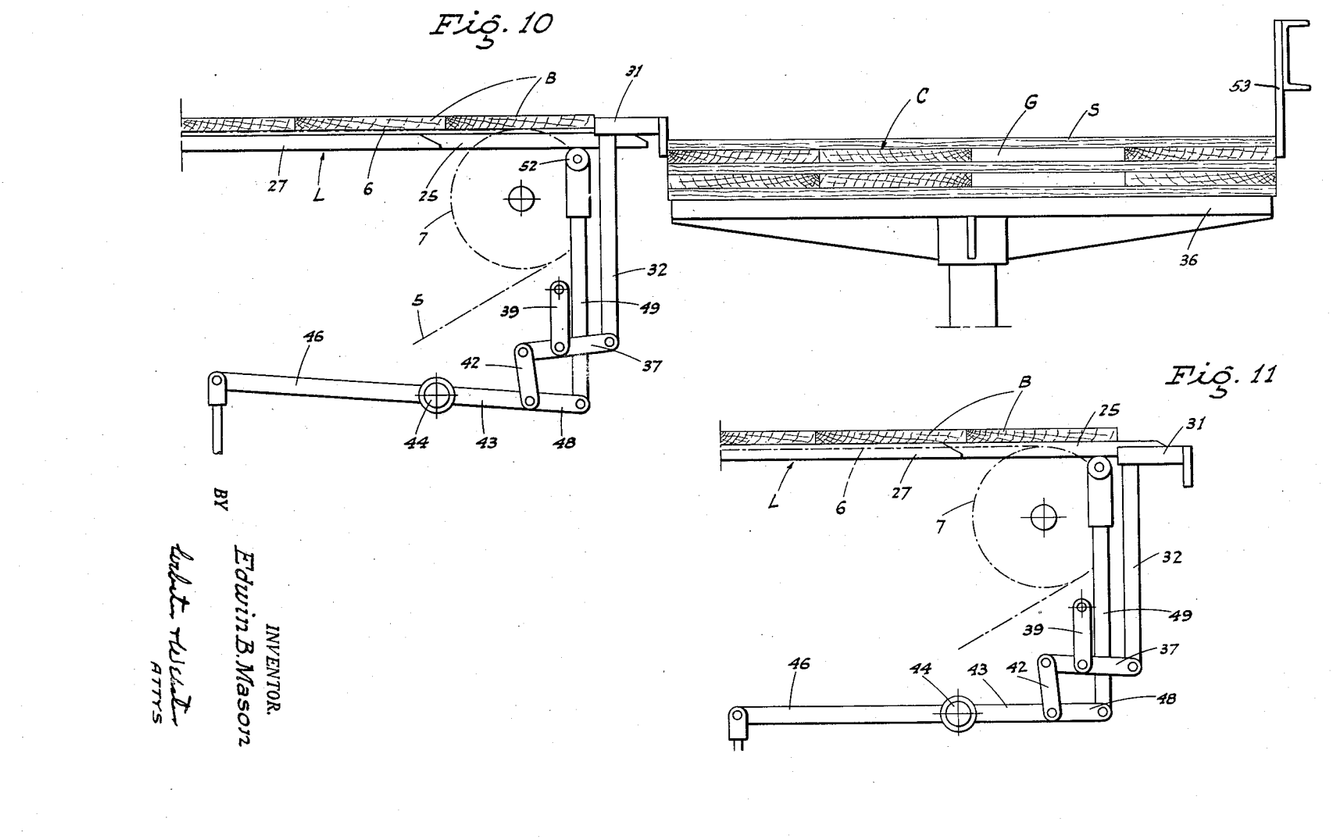
Fig. 10 is a side diagram of the lumber spreading and control mechanism, showing the position of the parts before a course of lumber for the stack is released and advanced.
Fig. 11 is a similar view showing said lumber course as received on the loader arm units and the stop lowered to allow of advance of the lumber.

At the outset, a number of boards sufficient to form a single course of the stack is fed by chains 5 until such boards—in contact with each other—are halted by the initially raised stops 31. At the same time, the driving of the chains is stopped. This position of the boards is shown in Figs. 10 and 11. The cylinder 47 is then actuated to lower the stops 31 and raise the arm units so that the plurality of boards is supported by the arms rather than by the chains, as shown in Fig. 11.

The motors 17 and 22 are then immediately placed in operation to advance the racks 12 and 13 and the arms 25 and 27 simultaneously and at the same speed, so that the advanced position of the long arms 25, which support the foremost board B, is retained. This advance of the arms and the boards supported thereon continues until the foremost board contacts a stop 53 mounted in a fixed position on the far side of the lift 36, and which stop (or stops) locates the adjacent side edge of the stack being formed in a vertical plane.

Figures 12, 13:
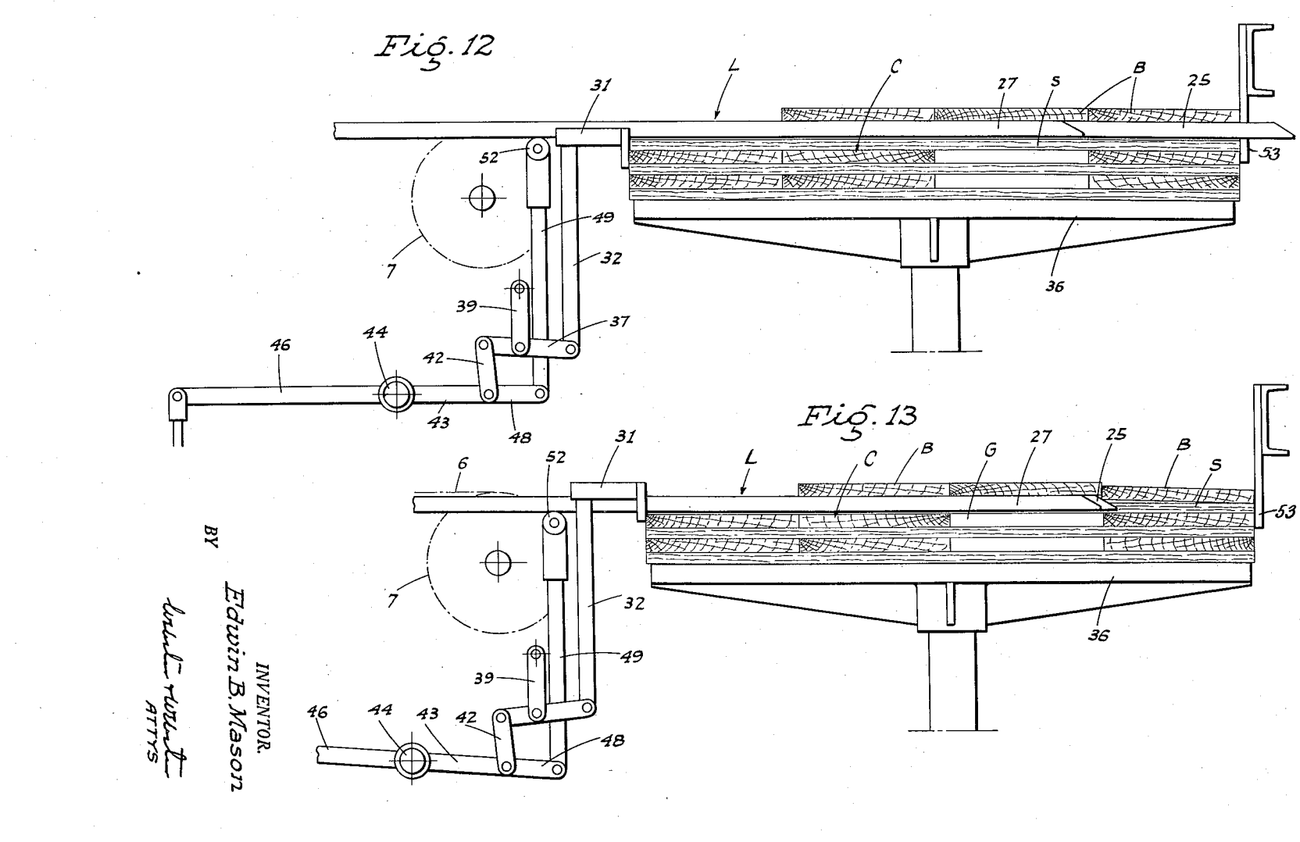
Fig. 12 is a similar view, showing the lumber course as fully advanced over the stack.
Fig. 13 is a similar view, showing the long loader arm as initially retracted to deposit the first length of lumber on the adjacent stickers of the stack.

This position of the boards and operating parts is shown in Fig. 12. It should be noted that, for the purposes of illustration, the width of the stack of lumber being formed on the lift 36, and the horizontal spacing between the adjacent faces of stops 31 and 53, is materially greater than the combined width of the number of boards employed for each course, which is shown as being three.

The motors 17 and 22 are then at once stopped, and the cylinder 47 is actuated to again raise the stops 31 and lower the loader arm units L to their initial level, as shown in Fig. 13. This places the arm units near the level of the course of boards C below the one now to be placed; the stickers S on said course C being located between the various arm units so as not to interfere therewith.

Immediately following this lowering of the arm units, motor 17—which controls the operation of racks 12 and the longitudinal arms 25—is placed in operation in reverse to retract said arms so as to allow the board carried thereby to fall into place on the adjacent stickers S. At the same time, motor 22 is held idle, so that the boards supported on the short arms 27 are not moved, and thus maintain the foremost board against stop 53 as the long arms move back from under said foremost board. This phase of the operations is shown in Fig. 13.

Because of the fact that the board-supporting ribs 28 on the long arms 25 are on a level below that of the board supporting plates 29 on the short arms 27, there is no contact by said ribs with the boards on plates 29, and thus no tendency for said boards to be shifted back as the long arms are retracted.

As soon as said foremost board has been dropped onto the stack, and the forward ends of the long and short arms are alined, motor 22 is placed in operation, also in reverse, so that the long and short arms of the units L are retracted simultaneously and at the same speed. As the arm units are retracted, the boards supported by arms 27 are retracted therewith until the rearmost board engages the forward face of stops 31, as shown in Fig. 14.

Figures 14, 15:
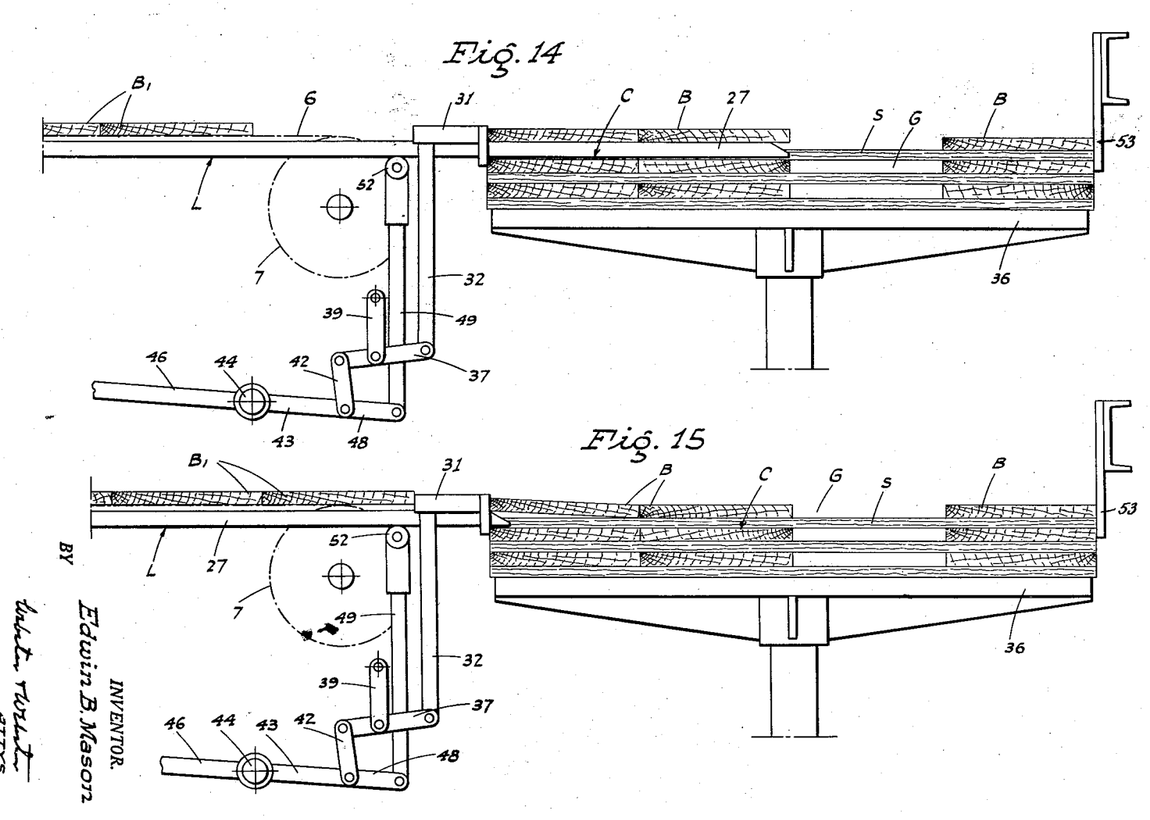
Fig. 14 is a similar view showing both the long and short loader arms as retracted sufficiently to retract the remaining lengths of lumber to a stop engaging position.
Fig. 15 is a similar view showing the loader arms as further retracted to deposit said remaining lengths of lumber onto the stickers.

Upon further retraction of the arm units the boards supported thereby are deposited on the stickers S, as shown in Fig. 15. The operation of motors 17 and 22 is then controlled so that the retraction of both arms of units L is halted when said arms arrive at the initial position of Fig. 10, or—in other words—with the short arms 27 retracted relative to the long arms 25. The course of boards as laid on the stickers thus leave a horizontal gap G whose width is determined by the difference between the combined width of the boards of the course and the distance between the stops 31 and 53.

In the meantime boards B, to form the next course on the stack are being fed forwardly by the runs 6 of the feed chains 5, as shown in Figs. 14 and 15, so as to be in position for advance by the subsequent operation of the loader arm units. Before such subsequent operation is effected, the lift 36 is lowered a distance equal to the thickness of a board and sticker, and another set of stickers is placed on the course just laid. It may be here noted that the stickers are preferably fed into place by the sticker feeder shown in my copending application for patent, Serial No. 602,994, filed August 9, 1957, now Patent No. 2,838,188.

It should also be noted that the chain drive motor M, the motors 17 and 22, and the air cylinder 47, are coordinated in their operation by means of control devices such as limit switches and the like, so that the stacker functions automatically in the feeding and laying of the various courses of a stack from the feed chains onto the lift 36.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired.

1. In a lumber stacking machine, means to initially support a single layer of transversely extending boards in adjacent relationship at the forward end of the machine and in number sufficient to form a course for a stack, a lift to support such stack positioned beyond the forward end of the machine, loader arm units under and normally clear of the supported boards, means mounting the units for reciprocating movement lengthwise of the machine and arranged for advance over the lift, means to advance and retract the arm units, a stop to engage the foremost board of the course as initially supported, and a mechanism connected to the arm units and the stop to raise the arm units into lifting and supporting engagement with said boards prior to advance of said units and at the same time move the stop clear of the boards.

2. In a lumber stacking machine, means to initially support a single layer of transversely extending boards in adjacent relationship at the forward end of the machine and in number sufficient to form a course for a stack, a lift to support such stack positioned beyond the forward end of the machine, loader arm units under and normally clear of the supported boards, means mounting the units for reciprocating movement lengthwise of the machine and arranged for advance over the lift, and comprising racks on which the arms are pivoted at their rear end, means mounting the racks for reciprocating movement lengthwise of the machine in a fixed horizontal plane so that the arms may be advanced over the lift, and reversible drive pinions engaging the racks; an element engaging each arm from below in supporting and relatively slidable relation, means to raise said element so as to raise the arm about its pivot sufficient to lift the boards from the initial supporting means, and means to then drive the pinions and advance the arms with the boards supported thereon over the lift; there being stop means arranged to then engage behind the rearmost board of the supported and advanced course so that upon retraction of the arms from over the lift the boards will drop onto said lift.

3. In a lumber stacking machine, a lift to support a stack of boards in horizontal courses, said stack having a predetermined width, loader arm units extending lengthwise of the machine and arranged to initially support a plurality of transversely extending boards in edge to edge relation and in a number sufficient to form a course for the stack but of a combined width less than that of the stack, means mounting the units for reciprocating movement lengthwise of the machine and so that said arm units may be advanced over the lift from an initial retracted position relative thereto, each arm unit comprising a long arm and a short arm, the arms being separate from each other but positioned in side by side relation with the long arm initially extending ahead of the short arm a distance not less than the width of the foremost board of a course and directly below such board, means to separately reciprocate the arms so that they may be advanced simultaneously to position all the supported boards over the lift, so that the movement of the short arm may then be halted while the long arm is retracted from below the board supported thereon whereby such board will drop onto the lift, and so that both arms may then be retracted simultaneously with the remaining boards supported thereon, and a stop arranged to engage behind the rearmost one of such boards subsequent to a predetermined amount of simultaneous retractive movement to halt the retracting movement of the boards with the arms whereby continued retraction of the arms then withdraws the same from under said boards and allows the same to drop onto the lift.

4. A structure, as in claim 3, in which the board supporting surface of the long arm is lower than the corresponding surface of the short arm.

References Cited in the file of this patent

UNITED STATES PATENTS

| | | |
|---|---|---|
| 2,397,720 | Beane | Apr. 2, 1946 |
| 2,730,247 | Lawson | Jan. 10, 1956 |